US010768844B2

(12) United States Patent
McGregor et al.

(10) Patent No.: US 10,768,844 B2
(45) Date of Patent: Sep. 8, 2020

(54) INTERNAL STRIPING INSIDE A SINGLE DEVICE

(71) Applicant: International Business Machines Corporation, Armonk, NY (US)

(72) Inventors: Harry R. McGregor, Tucson, AZ (US); Christopher B. Moore, Vail, AZ (US); Deborah A. Messing, Beit Sehemesh (IL); Itzhack Goldberg, Haifa (IL); Tomer Goldberg, Tel Aviv (IL); Avi Liani, Ramat-Hasharon (IL); Moshe Kalish, Modiin (IL); Jonathan Amit, Omer (IL)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 15/980,598

(22) Filed: May 15, 2018

(65) Prior Publication Data

US 2019/0354304 A1 Nov. 21, 2019

(51) Int. Cl.
G06F 3/06 (2006.01)

(52) U.S. Cl.
CPC ............ *G06F 3/0644* (2013.01); *G06F 3/061* (2013.01); *G06F 3/0646* (2013.01); *G06F 3/0673* (2013.01)

(58) Field of Classification Search
CPC ........................................... G06F 3/0673–0682
See application file for complete search history.

(56) References Cited

U.S. PATENT DOCUMENTS

| 7,647,451 | B1 | 1/2010 | Corbett et al. |
| 7,660,911 | B2 | 2/2010 | McDaniel |
| 8,214,404 | B2 * | 7/2012 | Kazar .................. G06F 3/0605 |
| | | | 707/797 |
| 8,819,092 | B2 | 8/2014 | Ludwig et al. |
| 8,996,535 | B1 | 3/2015 | Kimmel et al. |
| 9,118,695 | B1 * | 8/2015 | Korhonen ............... G06F 16/27 |
| 9,507,703 | B2 | 11/2016 | Muroyama et al. |

(Continued)

FOREIGN PATENT DOCUMENTS

| EP | 2933733 A1 | 10/2015 |
| EP | 2933733 A4 | 5/2016 |

OTHER PUBLICATIONS

Daniel J. Worden. Storage Networks. 2004. APress Media. pp. 103-114. (Year: 2004).*

(Continued)

*Primary Examiner* — Nathan Sadler
(74) *Attorney, Agent, or Firm* — Zilka Kotab, P.C.

(57) ABSTRACT

A computer-implemented method, according to one embodiment, is for performing internal striping within a subset of slices. The computer-implemented method includes: receiving, by a computer, a logical unit; splitting, by the computer, the logical unit into a plurality of data chunks; and distributing, by the computer, the plurality of data chunks across the subset of slices such that the plurality of data chunks are striped across the subset of slices, and striped across a plurality of physical partitions in each of the subset of slices. Moreover, each of the subset of slices correspond to a different physical storage module in a single storage device. Other systems, methods, and computer program products are described in additional embodiments.

25 Claims, 10 Drawing Sheets

(56) References Cited

U.S. PATENT DOCUMENTS

| | | | |
|---|---|---|---|
| 10,235,055 B1* | 3/2019 | Saad | G06F 3/067 |
| 2006/0085594 A1 | 4/2006 | Roberson et al. | |
| 2012/0036330 A1* | 2/2012 | Saito | G06F 3/0617 |
| | | | 711/162 |
| 2012/0047339 A1* | 2/2012 | Decasper | G06F 11/1076 |
| | | | 711/162 |
| 2012/0254554 A1* | 10/2012 | Nakajima | G06F 3/0607 |
| | | | 711/154 |
| 2013/0145105 A1* | 6/2013 | Sawicki | G06F 3/0619 |
| | | | 711/147 |
| 2014/0281121 A1* | 9/2014 | Karamcheti | G06F 3/061 |
| | | | 711/102 |

OTHER PUBLICATIONS

Varki et al., "A Performance Model of Disk Array Storage Systems," University of New Hampshire, 9 pages, retrieved on Dec. 2017, from http://citeseerx.ist.psu.edu/viewdoc/download?doi=10.1.1.3.8292&rep=rep1&type=pdf.

* cited by examiner

600

| 0  | P0S0  | P0S1  | ... | P0S63  |
|----|-------|-------|-----|--------|
| 1  | P1S0  | P1S1  | ... | P1S63  |
| 2  | P2S0  | P2S1  | ... | P2S63  |
| ⋮  | ⋮     | ⋮     | ⋮   | ⋮      |
| 63 | P63S0 | P63S1 | ... | P63S63 |

| 0  | P0S0  | P1S0  | ... | P63S0  |
|----|-------|-------|-----|--------|
| 1  | P0S1  | P1S1  | ... | P63S1  |
| 2  | P0S2  | P1S2  | ... | P63S2  |
| ⋮  | ⋮     | ⋮     | ⋮   | ⋮      |
| 63 | P0S63 | P1S63 | ... | P63S63 |

FIG. 6B

INTERNAL STRIPING INSIDE A SINGLE DEVICE

BACKGROUND

The present invention relates to data storage, and more specifically, this invention relates to the distribution of data across compute modules and internally striping the data.

Data striping is the technique of segmenting logically sequential data (such as a file) so that consecutive segments of the data are stored on different physical storage devices.

Striping is useful when a processing device requests data more quickly than a single storage device is able to provide the data. By spreading segments across multiple devices which can be accessed concurrently, total data throughput is increased. It is also a useful method for balancing input/output (I/O) loads across an array of storage devices such as disk drives. For instance, striping is used across disk drives in redundant array of independent disks (RAID) storage, network interface controllers, different computers in clustered file systems and grid-oriented storage, and RAM in some systems.

Moreover, grid storage is a collection of modules which are organized in a grid fashion and connected together in parallel. For instance, the modules may be connected together in parallel using InfiniBand and/or Ethernet connections. Each of the modules are typically an independent computer with its own memory, interconnections, disk drives, and other subcomponents. Each module also has a computing component which is capable of running a software platform, as well as an interface node which is used to route the incoming I/Os to the relevant module and process based on distribution logic.

While implementing striping in combination with grid storage has the potential to improve performance dramatically by distributing the load across all the grid storage cores, this combination has resulted in multiple limitations for conventional products. For instance, in conventional products, a storage administrator is required to create a group of striped volumes for each logical volume the application is planning to use, group the striped volumes together in consistency groups, define mirroring for each group separately, perform zoning for each group separately, etc.

Furthermore, many conventional operating systems are not able to support striping at all, thereby limiting users from implementing striping. As a result, conventional products result in users having to settle for limited performance while performing various applications, such as DB applications for Redo-Logs, Backup applications, Replication/Cloning applications, etc.

SUMMARY

A computer-implemented method, according to one embodiment, is for performing internal striping within a subset of slices. The computer-implemented method includes: receiving, by a computer, a logical unit; splitting, by the computer, the logical unit into a plurality of data chunks; and distributing, by the computer, the plurality of data chunks across the subset of slices such that the plurality of data chunks are striped across the subset of slices, and striped across a plurality of physical partitions in each of the subset of slices. Moreover, each of the subset of slices correspond to a different physical storage module in a single storage device which may be part of a storage grid array. The plurality of data chunks may also be striped across a plurality of successive slices. By splitting the logical unit into a plurality of data chunks and distributing the plurality of data chunks across the subset of slices as described above, a level of parallelism is achieved which allows multiple compute modules to contribute toward performing data processing of even a single partition. As a result, workloads are better balanced across a plurality of compute modules, even when only a single partition of data is being processed. Furthermore, the distribution may be performed without introducing any additional metadata to the data management process, thereby improving the overall performance of the array while also significantly reducing the latency.

The computer-implemented method may also include: receiving, by the computer, a read request; splitting, by the computer, the read request into a plurality of portions; distributing, by the computer, the plurality of portions across compute elements coupled to the physical storage modules such that one or more of the plurality of portions of the read request are processed by each of the compute elements in parallel; receiving, by the computer, data corresponding to the plurality of portions of the read request from the compute elements; and satisfying, by the computer, the read request. Accordingly, while reading, an embodiment may also be able to benefit from the improvements realized during the striping processes mentioned above. For instance, by splitting the read request into a plurality of portions, each of which is distributed to a different compute element, a level of parallelism is achieved while performing a read request. This level of parallelism allows multiple compute modules to contribute toward performing read requests, and as a result, workloads are better balanced across a plurality of compute modules. Furthermore, as mentioned above, the distribution may be performed without introducing any additional metadata to the data management process, thereby improving the overall performance of the array while also significantly reducing the latency.

A computer program product, according to another embodiment, is for performing internal striping within a subset of slices. The computer program product includes a computer readable storage medium having program instructions embodied therewith. Moreover, the computer readable storage medium is not a transitory signal per se. The program instructions are readable and/or executable by a processor to cause the processor to perform a method which includes: receiving, by the processor, a logical unit; splitting, by the processor, the logical unit into a plurality of data chunks; and distributing, by the processor, the plurality of data chunks across the subset of slices such that the plurality of data chunks are striped across the subset of slices, and striped across a plurality of physical partitions in each of the subset of slices. Moreover, each of the subset of slices correspond to a different physical storage module in a single storage device which may be part of a storage grid array. The plurality of data chunks may also be striped across a plurality of successive slices. By splitting the logical unit into a plurality of data chunks and distributing the plurality of data chunks across the subset of slices as described above, a level of parallelism is achieved which allows multiple compute modules to contribute toward performing data processing of even a single partition. As a result, workloads are better balanced across a plurality of compute modules, even when only a single partition of data is being processed. Furthermore, the distribution may be performed without introducing any additional metadata to the data management process, thereby improving the overall performance of the array while also significantly reducing the latency.

The program instructions may also be readable and/or executable by the processor to cause the processor to perform the method which includes: receiving, by the processor, a read request; splitting, by the processor, the read request into a plurality of portions; distributing, by the processor, the plurality of portions across compute elements coupled to the physical storage modules such that one or more of the plurality of portions of the read request are processed by each of the compute elements in parallel; receiving, by the processor, data corresponding to the plurality of portions of the read request from the compute elements; and satisfying, by the processor, the read request. Accordingly, while reading, an embodiment may also be able to benefit from the improvements realized during the striping processes mentioned above. For instance, by splitting the read request into a plurality of portions, each of which is distributed to a different compute element, a level of parallelism is achieved while performing a read request. This level of parallelism allows multiple compute modules to contribute toward performing read requests, and as a result, workloads are better balanced across a plurality of compute modules. Furthermore, as mentioned above, the distribution may be performed without introducing any additional metadata to the data management process, thereby improving the overall performance of the array while also significantly reducing the latency.

A computer program product, according to yet another embodiment, includes a computer readable storage medium having program instructions embodied therewith. The computer readable storage medium is not a transitory signal per se. Moreover, the program instructions readable and/or executable by a processor to cause the processor to perform a method which includes: receiving, by the processor, a read request; splitting, by the processor, the read request into a plurality of portions; distributing, by the processor, the plurality of portions across compute elements coupled to physical storage modules in a single storage device; receiving, by the processor, data corresponding to the plurality of portions of the read request from the compute elements; and satisfying, by the processor, the read request. The plurality of portions are distributed such that one or more of the plurality of portions of the read request are processed by each of the compute elements in parallel. By splitting the read request into a plurality of portions, each of which is distributed to a different compute element, a level of parallelism is achieved while performing the read request. This level of parallelism allows multiple compute modules to contribute toward performing read requests, and as a result, workloads are better balanced across a plurality of compute modules. Furthermore, as mentioned above, the distribution may be performed without introducing any additional metadata to the data management process, thereby improving the overall performance of the array while also significantly reducing the latency.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6A is a representational view of a table having partition index and strip index information in accordance with one embodiment.

FIG. 6B is a representational view of a table having partition index and strip index information in accordance with one embodiment.

DETAILED DESCRIPTION

Figure 1:
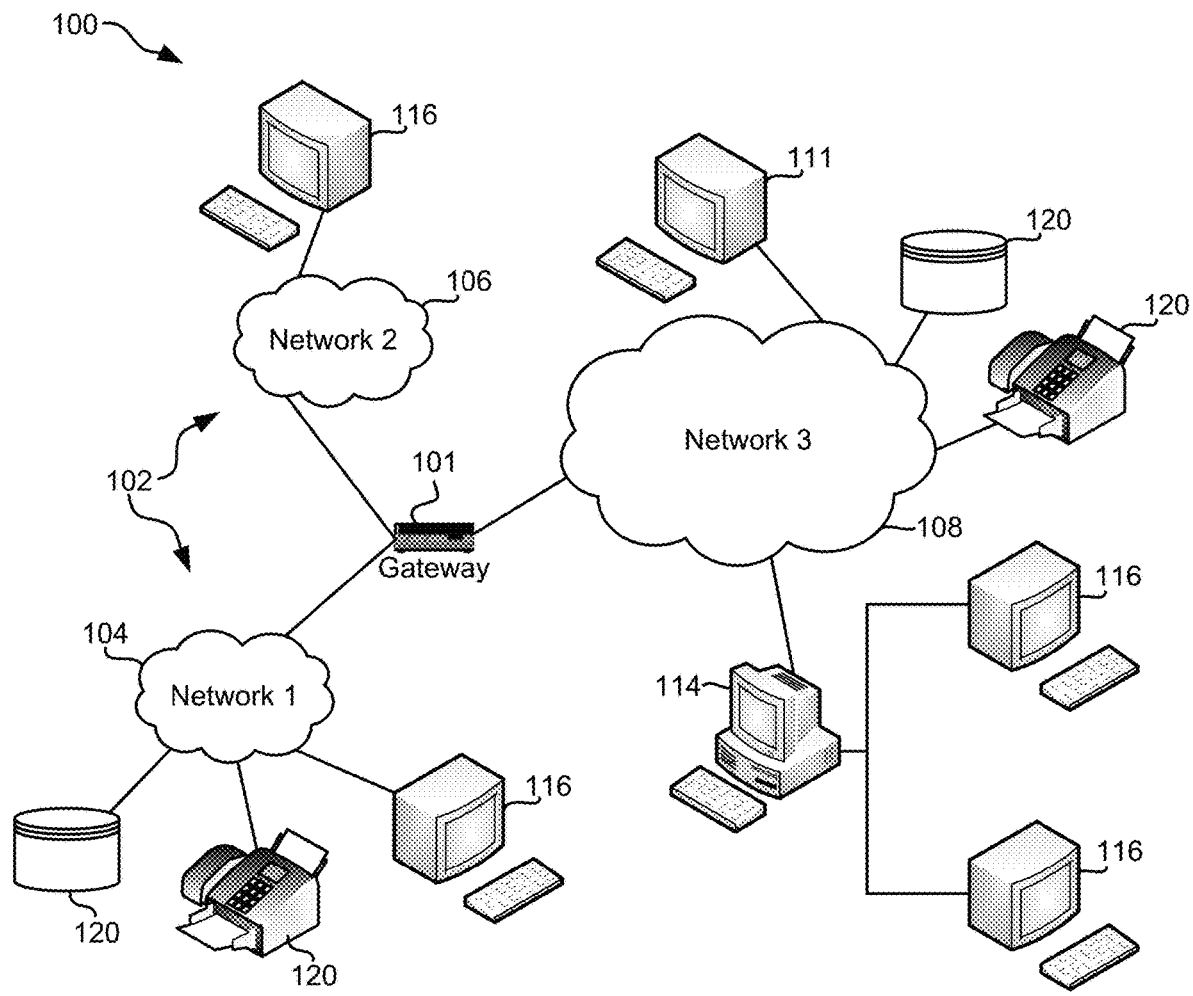
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for providing a level of parallelism which allows multiple compute modules to contribute toward performing a data request. Moreover, these improvements are achieved without introducing any additional metadata to the data management process. Accordingly, various ones of the approaches included herein may be able to reduce processing latency, decrease the computational workloads placed on different processors, increase data access times, etc., without increasing memory consumption, e.g., as will be described in further detail below.

In one general embodiment, a computer-implemented method is for performing internal striping within a subset of slices. The computer-implemented method includes: receiving, by a computer, a logical unit; splitting, by the computer, the logical unit into a plurality of data chunks; and distributing, by the computer, the plurality of data chunks across the subset of slices such that the plurality of data chunks are striped across the subset of slices, and striped across a plurality of physical partitions in each of the subset of slices. Moreover, each of the subset of slices correspond to a different physical storage module in a single storage device which may be part of a storage grid array. The plurality of data chunks may also be striped across a plurality of successive slices. By splitting the logical unit into a plurality of data chunks and distributing the plurality of data chunks across the subset of slices as described above, a level of parallelism is achieved which allows multiple compute modules to contribute toward performing data processing of even a single partition. As a result, workloads are better balanced across a plurality of compute modules, even when only a single partition of data is being processed. Furthermore, the distribution may be performed without introducing any additional metadata to the data management process, thereby improving the overall performance of the array while also significantly reducing the latency.

In another general embodiment, a computer program product is for performing internal striping within a subset of slices. The computer program product includes a computer readable storage medium having program instructions embodied therewith. Moreover, the computer readable storage medium is not a transitory signal per se. The program instructions are readable and/or executable by a processor to cause the processor to perform a method which includes: receiving, by the processor, a logical unit; splitting, by the processor, the logical unit into a plurality of data chunks; and distributing, by the processor, the plurality of data chunks across the subset of slices such that the plurality of data chunks are striped across the subset of slices, and striped across a plurality of physical partitions in each of the subset of slices. Moreover, each of the subset of slices correspond to a different physical storage module in a single storage device which may be part of a storage grid array. The plurality of data chunks may also be striped across a plurality of successive slices. By splitting the logical unit into a plurality of data chunks and distributing the plurality of data chunks across the subset of slices as described above, a level of parallelism is achieved which allows multiple compute modules to contribute toward performing data processing of even a single partition. As a result, workloads are better balanced across a plurality of compute modules, even when only a single partition of data is being processed. Furthermore, the distribution may be performed without introducing any additional metadata to the data management process, thereby improving the overall performance of the array while also significantly reducing the latency.

In yet another general embodiment, a computer program product includes a computer readable storage medium having program instructions embodied therewith. The computer readable storage medium is not a transitory signal per se. Moreover, the program instructions readable and/or executable by a processor to cause the processor to perform a method which includes: receiving, by the processor, a read request; splitting, by the processor, the read request into a plurality of portions; distributing, by the processor, the plurality of portions across compute elements coupled to physical storage modules in a single storage device; receiving, by the processor, data corresponding to the plurality of portions of the read request from the compute elements; and satisfying, by the processor, the read request. The plurality of portions are distributed such that one or more of the plurality of portions of the read request are processed by each of the compute elements in parallel. By splitting the read request into a plurality of portions, each of which is distributed to a different compute element, a level of parallelism is achieved while performing the read request. This level of parallelism allows multiple compute modules to contribute toward performing read requests, and as a result, workloads are better balanced across a plurality of compute modules. Furthermore, as mentioned above, the distribution may be performed without introducing any additional metadata to the data management process, thereby improving the overall performance of the array while also significantly reducing the latency.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks depending on the desired approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
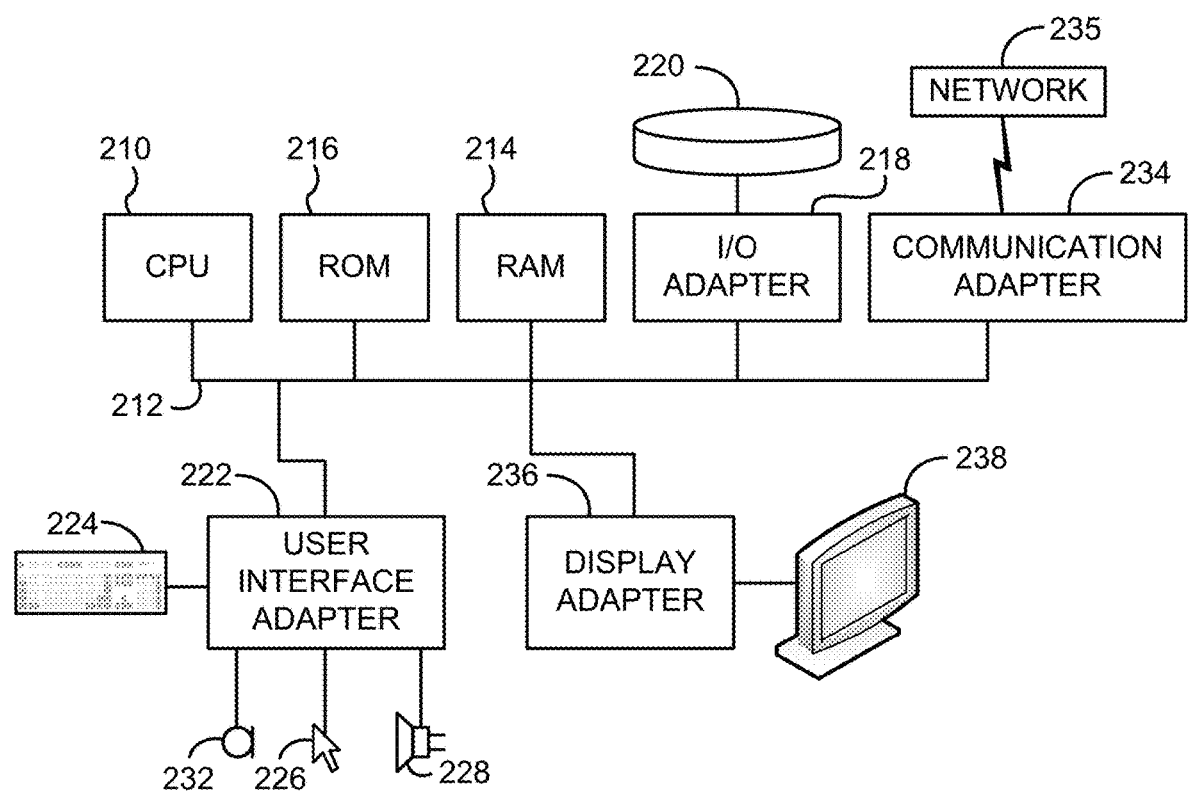
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred approaches may also be implemented on platforms and operating systems other than those mentioned. A preferred approach may be written using eXtensible Markup Language (XML), C, and/or C++ language, or other programming languages, along with an object oriented programming methodology. Object oriented programming (OOP), which has become increasingly used to develop complex applications, may be used.

Figure 3:
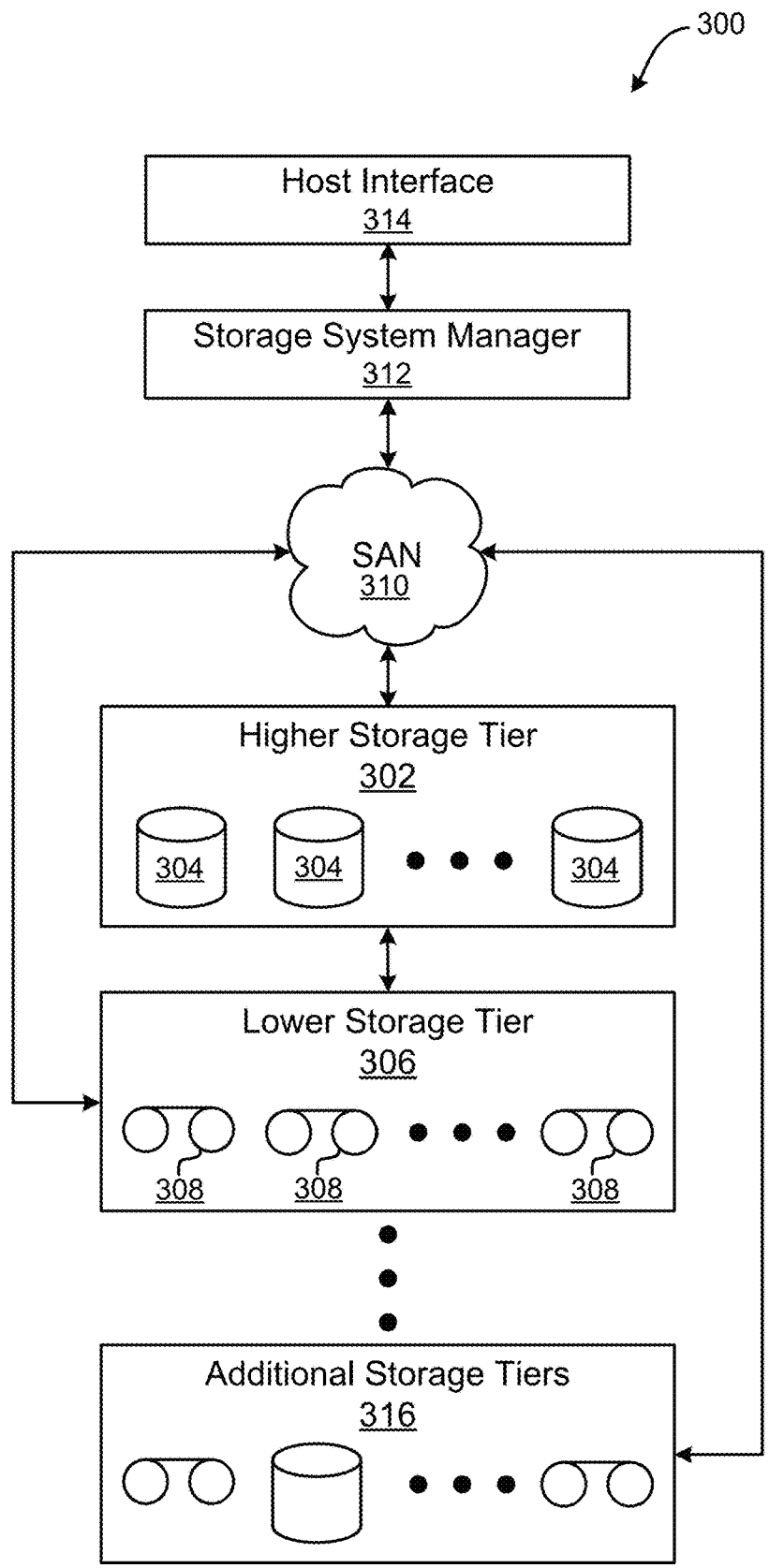
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various approaches. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In other approaches, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the various approaches presented herein.

According to some approaches, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various approaches.

As described above, data striping is the technique of segmenting logically sequential data (such as a file) so that consecutive segments of the data are stored on different physical storage devices. Data striping is useful when a processing device requests data more quickly than a single storage device is able to provide the data. By spreading segments across multiple devices which can be accessed concurrently, total data throughput is increased. It is also a useful method for balancing input/output (I/O) loads across an array of storage devices such as disk drives. For instance, striping is used across disk drives in RAID storage, network interface controllers, different computers in clustered file systems and grid-oriented storage, and RAM in some systems.

Moreover, grid storage generally includes a collection of modules which are organized in a grid fashion and connected together in parallel. For instance, the modules may be connected together in parallel using InfiniB and, Ethernet, etc., connections. Each of the modules are typically an independent computer with its own memory, interconnections, data storage drives, and other subcomponents. Each module also has a computing component which is capable of running a software platform, as well as an interface node which is used to route the incoming I/Os to the relevant module and process based on distribution logic.

While implementing striping in combination with grid storage has the potential to improve performance dramatically by distributing the load across all the grid storage cores, this combination has resulted in multiple limitations for conventional products. For instance, in conventional products, a storage administrator is required to create a group of striped volumes for each logical volume the application is planning to use, group the striped volumes together in consistency groups, define mirroring for each group separately, perform zoning for each group separately, etc.

Furthermore, many conventional operating systems are not able to support striping, thereby limiting users from implementing striping at all. As a result, conventional products cause users to settle for limited performance while performing various applications, such as DB applications for Redo-Logs, Backup applications, Replication/Cloning applications, etc.

Storage environments, e.g., such as a storage area networks (SANs), may also implement logical units (LUNs) which refer to a specific portion of storage in the storage environment. As a result, logical units may be used as unique identifiers for separate storage devices in the storage environment, thereby allowing for each of the separate storage devices to be individually accessed by various protocols.

A minimum logical unit size may be determined based on a partition size and a number of slices included in a given storage device. According to an example which is in no way intended to limit the invention, a storage device having 16,000 slices and a partition size of 1 MB would have a minimum logical unit size of 16 GB. A "partition" is a logical unit size that all data in the system may be broken down into. Thus, each individual unit referred to as a "partition" preferably contains data as well as the relevant metadata for that respective individual unit. Moreover, a "slice" is a grouping of partitions, each of which are managed by a same compute module and are stored on the same physical storage device, e.g., as would be appreciated by one skilled in the art after reading the present description. Accordingly, each of the slices may include data that a corresponding compute module is responsible for processing during queries.

Moreover, the various slices in grid storage may be managed by multiple compute modules (e.g., processors) such that each compute module manages (e.g., is in control of) a subset of the slices. Moreover, slices may be migrated from one storage device to another as desired. Thus, as storage space is increased and/or decreased due to planned activity, as a result of a failure, etc., slices may be migrated accordingly.

However, in conventional products, a given logical partition is mapped to a physical partition of the same size using external striping processes. Thus, as each compute module processes a chunk of data for the slices corresponding thereto, the chunk of data is being processed by one compute module. While smaller chunks of data, e.g., such as a 1 MB chunk of data, may be processed by a single computing module relatively easily, as the size of a grid storage array (e.g., environment) increases in an effort to support larger data storage capacities, the partition size increases as well in order to keep the metadata overhead at a manageable level. Additionally, many storage arrays support compression which is a computation-intensive process. Accordingly, conventional products experience issues with processing data of even a single partition, especially in situations where the data is not accessed and/or written randomly across the whole storage array. In other words, these conventional shortcomings are even more pronounced in situations where the I/O activity is sequential, or serial, in nature, e.g., such as during backup procedures. During a backup procedure, conventional products read all the data stored in a partition and decompress the data using a single compute module.

In sharp contrast, various approaches included herein are able to overcome the aforementioned conventional shortcomings by providing a level of parallelism which allows multiple compute modules to contribute toward performing data processing of even a single partition. In various approaches, this may be achieved by distributing data across a plurality of slices in a storage device, as well as implementing partitions in a way that the workload is better balanced across a plurality of compute modules, even when only a single partition of data is being processed. Furthermore, this distribution may be performed without introducing any additional metadata to the data management process. By doing that the overall performance of the array is improved and the latency is significantly reduced, e.g., as will be described in further detail below.

Some of the approaches included herein which implement grid storage arrays may also provide thin-provisioning. As a result, physical space in memory is not consumed unless it is being and/or has actually been written to. While thin provisioning is available in some conventional products, once a single byte is written to memory in these conventional products, the system discounts (decrements) the available amount of storage space by the size of a whole set of 16,000+ partitions to ensure space is available for the logical unit corresponding to the single byte. In doing so, conventional products actually diminish the "thinness" that the storage is able to provide.

However, various approaches included herein are also able to overcome these shortcomings by ensuring a desirable distribution of logical partitions across 'N' physical partitions in memory. Thus, rather than mapping a logical partition one-to-one with a physical partition in a slice as seen in conventional products, approaches included herein spread logical partition data across multiple different physical partitions. For example, a storage device may have two or more, e.g., 4, different physical partitions in memory, each of which would share an incoming data load among them.

Figure 4A:
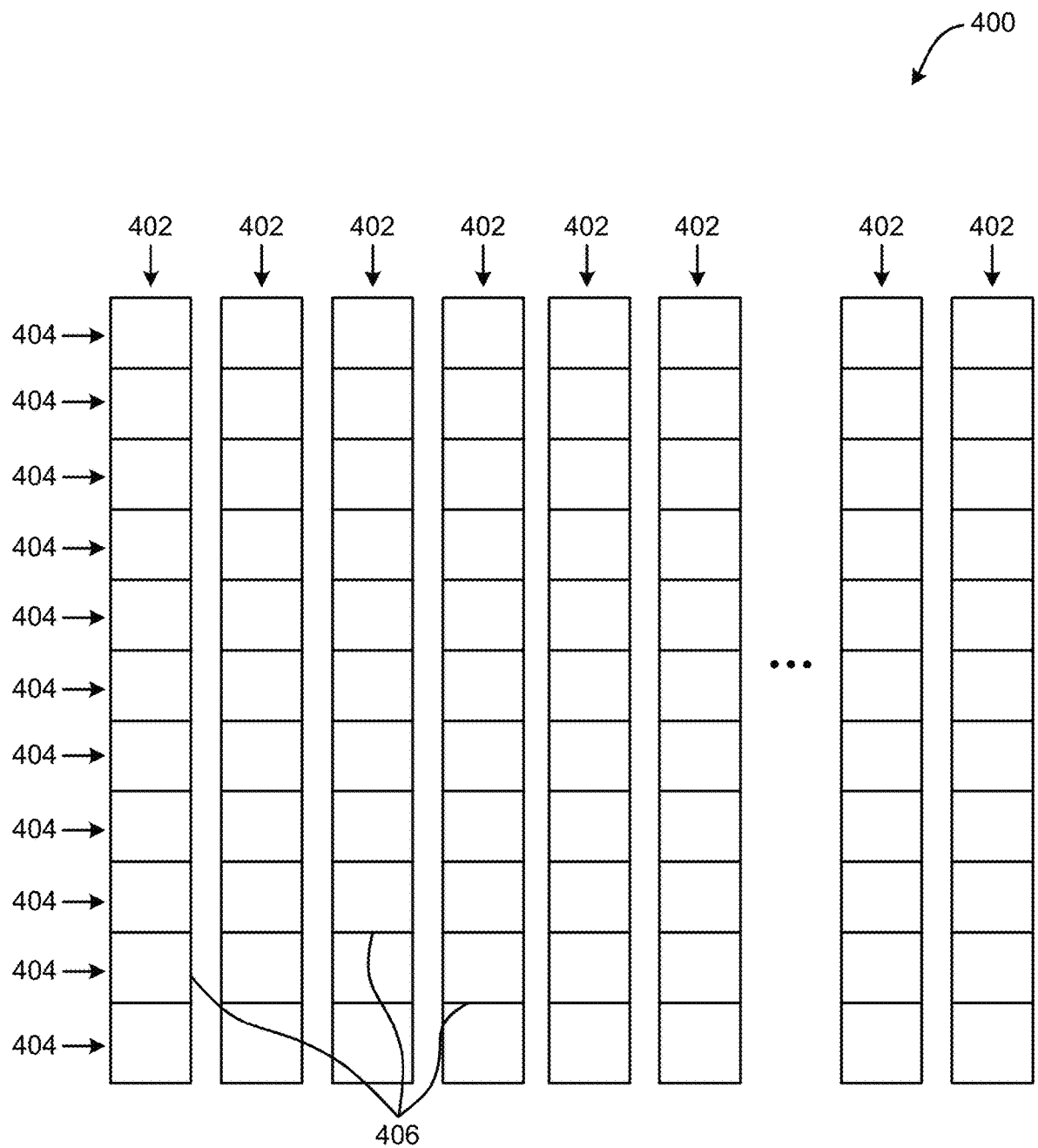
FIG. 4A is a partial representational view of a grid based storage array architecture in accordance with one embodiment.

As described briefly above, grid storage generally includes a collection of modules which are organized in a grid fashion and connected together in parallel. Looking to FIG. 4A, a grid based storage array architecture 400 is illustrated in accordance with one embodiment. As an option, the present grid based storage array architecture 400 may be implemented in conjunction with features from any other embodiment listed herein, such as those described with reference to the other FIGS., such as FIG. 3. However, such grid based storage array architecture 400 and others presented herein may be used in various applications and/or in permutations which may or may not be specifically described in the illustrative embodiments listed herein. Further, the grid based storage array architecture 400 presented herein may be used in any desired environment. Thus FIG. 4A (and the other FIGS.) may be deemed to include any possible permutation.

Each column 402 in the grid based storage array architecture 400 corresponds to a different physical partition of a storage device. Moreover, each row 404 in the grid based storage array architecture 400 includes a plurality of strips 406, where each strip 406 in a given row 404 is located in a different physical partition of the storage device. It should also be noted that strips 406 in a given row 404 may begin at the same or at different logical block addresses (LBAs), e.g., depending on the desired approach.

In some approaches, a table may be used to manage the data stored in each of the addresses of the grid based storage array architecture 400. For example, each of the positions in the grid based storage array architecture 400 may be represented by a physical partition index and a strip index. Moreover, each pair of indexes may be organized in a table (e.g., see FIGS. 6A-6B below) which may be used to distribute data according to various approaches included herein.

Data is preferably distributed through grid based storage arrays by internally striping the data. Looking to FIG. 4B, a storage system 450 implementing internal striping is illustrated in accordance with one embodiment. As an option, the present storage system 450 may be implemented in conjunction with features from any other embodiment listed herein, such as those described with reference to the other FIGS., such as FIG. 4A. However, such storage system 450 and others presented herein may be used in various applications and/or in permutations which may or may not be specifically described in the illustrative embodiments listed herein. Further, the storage system 450 presented herein may be used in any desired environment. Thus FIG. 4B (and the other FIGS.) may be deemed to include any possible permutation.

As shown, a logical unit 452 is received at the grid storage array 454 from a host 456. The grid storage array 454 may be coupled to the host 456 using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description. Moreover, although the grid storage array 454 environment is only shown as being coupled to one host, in other approaches the grid storage array 454 environment may be coupled to any desired number of hosts. The host 546 in turn is coupled to an interface with a file system (not shown). According to one approach, the connection between the host 546 and the file system may be made using any desired type of network.

The grid storage array 454 includes a plurality of compute modules 458, each of which includes an interface node 460, striping formula module 462 and a memory node 464 which may include cache. Each of the striping formula modules 462 and memory nodes 464 are configured such that they may communicate with each other as represented by the double sided arrows. Moreover, it should be noted that the grid storage array 454 is preferably included in a single storage device. However, it should be noted that the size, style, architecture, organization, etc. of the "single storage device" in which the grid storage array 454 is implemented may vary depending on the approach, and is in no way intended to limit the invention. For instance, the "single storage device" is preferably a collection of successive partitions grouped together and managed as one internally striped entity. Accordingly, in some approaches the single storage device may be a storage tier of a storage system (e.g., see storage tiers 302, 306, 316 of FIG. 3), the storage media thereof being grouped together and managed as one internally striped entity. Accordingly, each of the storage media may be considered different physical storage modules in the same single storage device. In some approaches the single storage device may include at least one hard disk drive. In other approaches the single storage device includes at least one solid state drive. In still other approaches, the single storage device may actually be a distributed system which is grouped together and managed as one internally striped entity. Moreover, each of the storage media included in the distributed system may be considered different physical storage modules in the same single storage device. However, it is preferred that the single storage device is part of the storage grid array.

The logical unit 452 may be received by a central controller 466 of the grid storage array 454. Moreover, the central controller 466 may send the logical unit 452 to one or more of the compute modules 458 such that the logical unit 452 may be divided into a plurality of data chunks. The logical unit 452 is preferably divided into data chunks using a striping formula which may be implemented by any one or more of the striping formula modules 462. Once the logical unit 452 has been divided into a plurality of data chunks, the data chunks may further be distributed throughout the grid storage array 454 between the striping formula modules 462 and/or memory nodes 464. Accordingly, the data chunks may be distributed throughout the grid storage array 454 in the single storage device as a result of performing the internal striping of the received logical unit 452.

Details corresponding to how the internal striping and distribution of the data chunks may be performed are described in the various approaches included herein. Accordingly, any one or more of the approaches included herein may be implemented by any of the components included in FIG. 4B, e.g., as would be appreciated by one skilled in the art after reading the present description.

However, the logical unit 452 received at the grid storage array 454 may actually be the product of an external striping process. In other words, the logical unit 452 may be formed from a logical volume received by the host 456. Looking now to FIG. 4C, a storage system 470 implementing external striping is illustrated. Although the type of striping performed in each of FIGS. 4B and 4C differ, FIGS. 4B-4C do include a number of similar components. Accordingly, various components of FIG. 4C have common numbering with those of FIG. 4B, which is in no way intended to limit the invention.

Figure 4B:
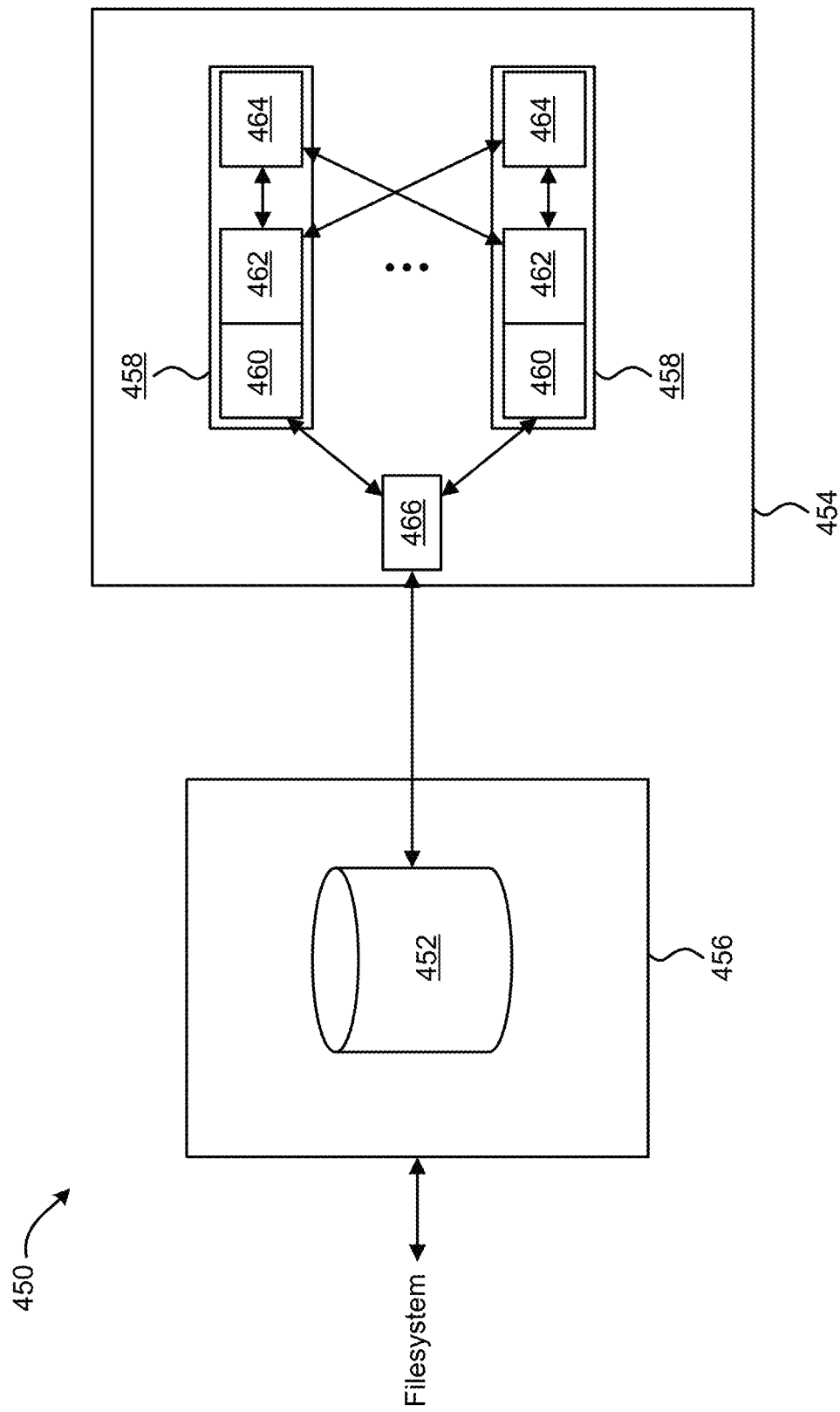
FIG. 4B is a partial representational view of a storage system in accordance with one embodiment.
Figure 4C:
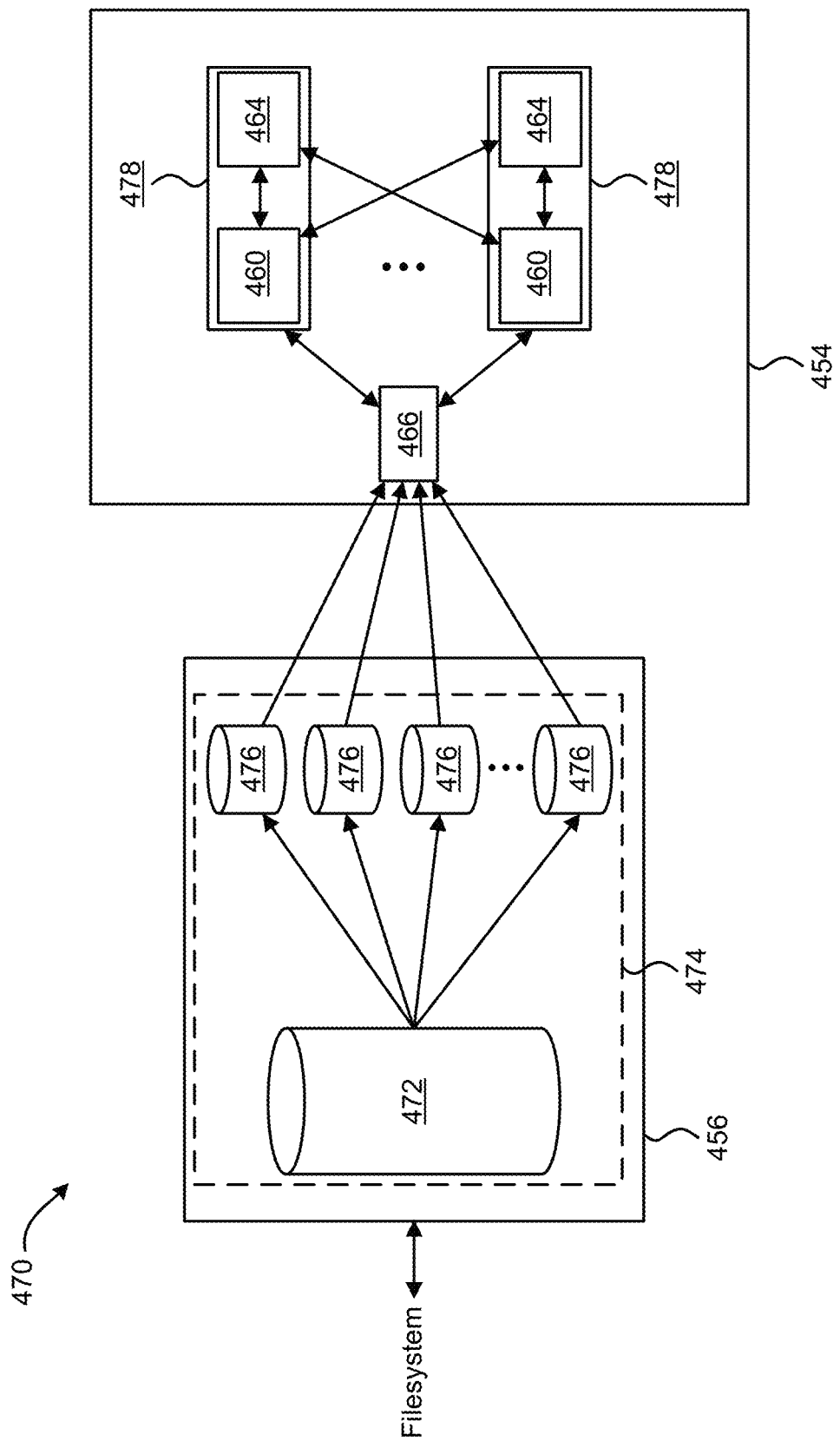
FIG. 4C is a partial representational view of a storage system in accordance with one embodiment.

Looking to FIG. 4C, a logical volume 472 is received from a filesystem (not shown), and processed by a logical volume array 474 at the host 456 location. More specifically, the logical volume array 474 splits the logical volume 472 into a plurality of logical units 476 using an external striping process. Moreover, each of the logical units 476 are then sent to the grid storage array 454 and stored across all stripes in the memory nodes 464 by the various grid modules 478.

While external striping provides some improvement to efficiency by which a logical volume is actually transitioned to memory, as mentioned above, as the size of a grid storage array increases in an effort to support larger data storage capacities, the partition size increases as well in order to keep the metadata overhead at a manageable level. However, as the partition size increases, so do the size of the logical units 476 in order to fill each of the partitions and avoid wasted storage space. As a result, grid storage arrays which only implement external striping experience issues with processing data of even a single partition, especially in situations where the data is not accessed and/or written randomly across the whole storage array.

Accordingly, by implementing internal striping as seen in FIG. 4B in combination with external striping as seen in FIG. 4C, significant improvements to the efficiency by which data may be stored in a grid storage array may be significantly improved without introducing any additional metadata to the data management process. Accordingly, various ones of the approaches included herein may be able to reduce processing latency, decrease the computational workloads placed on different processors, increase data access times, etc., without increasing memory consumption, by implementing internal striping.

Figure 5:
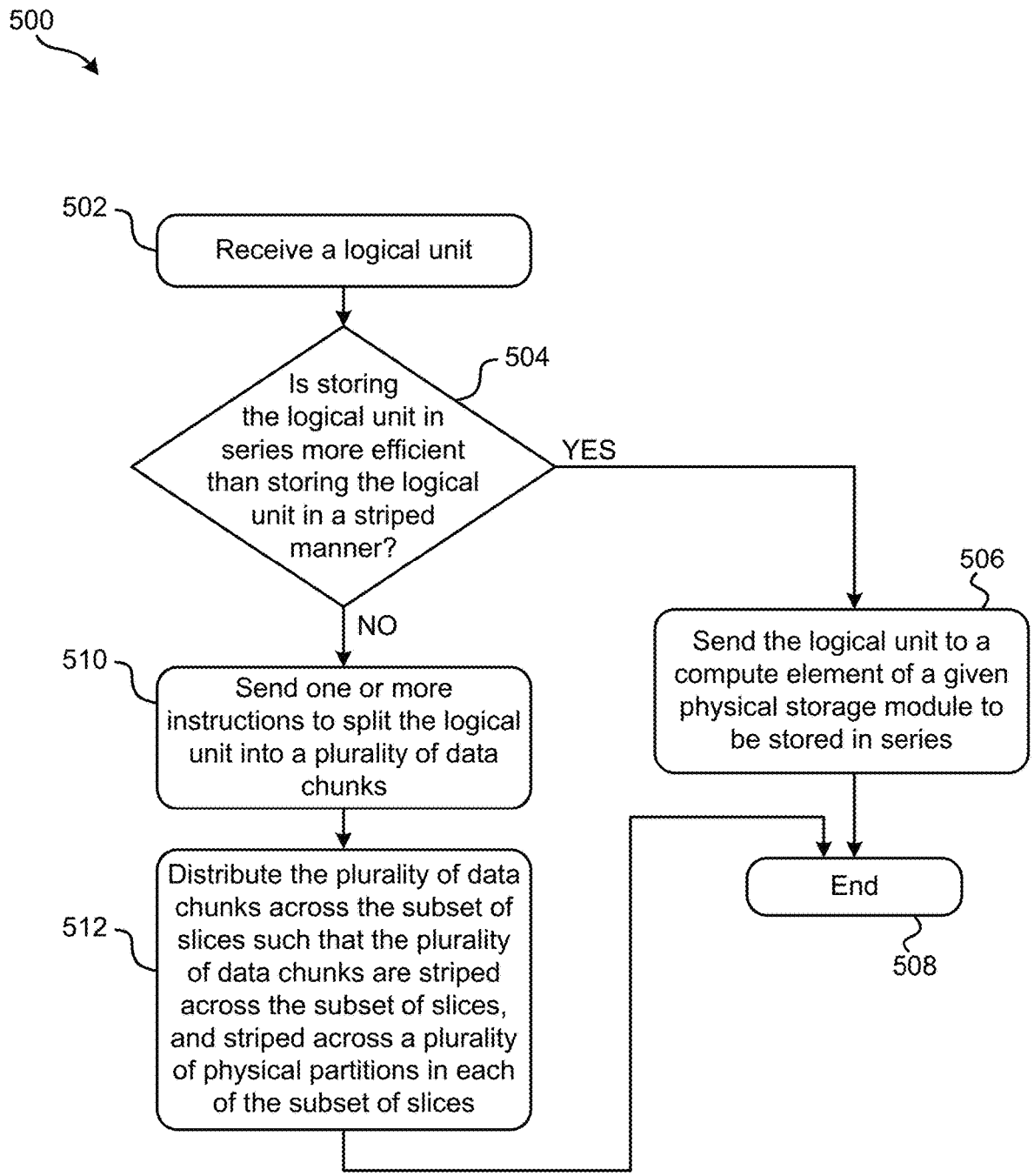
FIG. 5 is a flowchart of a method in accordance with one embodiment.

Accordingly, looking to FIG. 5, a flowchart of a method 500 for performing internal striping within a subset of slices inside a single storage device is shown according to one embodiment. The method 500 may be performed in accordance with the present invention in any of the environments depicted in FIGS. 1-4C, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, any one or more of the processes included in method 500 may be performed by a central controller of the grid storage array (e.g., see 466 in FIG. 4B above). However, in another example, various ones of the processes included in method 500 may be performed by one or more of the compute elements in a storage grid array. In various other approaches, any one or more of the processes included in method 500 may be partially or entirely performed by a controller, a processor, a computer, etc., or some other device having one or more processors therein. Thus, in some embodiments, method 500 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, operation 502 of method 500 includes receiving a logical unit. Depending on the approach, the logical unit may be received from a host, from a controller, another storage system, etc. According to an exemplary approach, the logical unit may be received as a result of an external striping operation performed on a logical volume. As described above (e.g., see FIG. 4C), a logical volume may be received from a filesystem, whereby external striping may be performed on the logical volume. The external striping may be performed by a logical volume array or any other desired processing component(s). Moreover, the external processing may split the logical volume into a plurality of logical units, each of which includes LBA data corresponding thereto.

Accordingly, the existing LBA data corresponding to the logical unit received may be available for use. In some approaches the logical unit received in operation 502 may include a plurality of sequential LBA data which may be used to perform additional processes involved with actually storing the received logical unit. In one example, the LBA data may be used to split the logical unit into a plurality of data chunks using a striping formula, e.g., as will be described in further detail below. Accordingly, existing LBA data received with the logical unit may be stored in memory such that it may later be accessed for use.

While implementing internal striping to store the data of a logical unit achieves significant improvements in many situations, there are some instances where storing certain configurations of data in a sequential manner may be more efficient. Accordingly, method 500 includes decision 504 which may be used to determine whether storing the logical unit in series is more efficient than storing the logical unit in a striped (e.g., distributed) manner according to the particular situation. According to various approaches, the determination as to whether storing the logical unit in series (e.g., sequentially) is more efficient than storing the logical unit in a striped manner may be based, at least in part, on the size of the logical unit, a number of available compute nodes, a current workload of the grid storage array, etc. In other approaches, the determination may be made by comparing characteristics and/or parameters of the logical unit to pre-defined criteria to determine which storage technique is more efficient, selecting one of the storage techniques based on historical data for similar logical units, etc., or any other technique that would become apparent to one skilled in the art upon reading the present description.

The flowchart proceeds to operation 506 in response to determining that storing the logical unit in series is more efficient than storing the logical unit in a striped manner. There, operation 506 includes sending the logical unit to a compute element of a given physical storage module to be stored in series. Because the logical unit is sent to a single storage module, the particular storage module which the logical unit is actually sent to may vary depending on the situation. For instance, the logical unit may be sent to a physical storage module having a highest amount of available data storage space, a physical storage module having the greatest amount of computing power, a physical storage module having a lowest current throughput, etc., depending on the desired approach.

From operation 506, the flowchart of FIG. 5 proceeds to operation 508, whereby method 500 may end. However, it should be noted that although method 500 may end upon reaching operation 508, any one or more of the processes included in method 500 may be repeated in order to store additional logical units which may be received. In other words, any one or more of the processes and/or operations included in method 500 may be repeated in order to determine how to most efficiently store received logical units.

Returning to decision 504, method 500 proceeds to operation 510 in response to determining that that storing the logical unit in series is not more efficient than storing the logical unit in a striped manner. There, operation 510 includes sending one or more instructions to split the logical unit into a plurality of data chunks. The number of data chunks which the logical unit is split into may depend on the size of the logical unit, the number of physical partitions in memory, user preference, a size of the logical volume, etc. A striping formula is also preferably used during the process of splitting the logical unit into a plurality of data chunks. Accordingly, operation 510 may include sending one or more instructions to a striping formula module, the one or more instructions causing the striping formula module to perform a striping formula on LBA data corresponding to the logical unit and/or the logical unit itself.

The striping formula may be able to transform sequential LBAs corresponding to the received logical unit, into LBAs which may be distributed across multiple partitions. In other words, the striping formula may desirably be used to transform LBA data received with the logical unit, from a plurality of sequential LBA data, to LBA data which may be used to distribute chunks of the logic unit across the grid storage array. For example, see the in-use example described below with respect to FIGS. 6A-6B. This transformation may be achieved by modifying the LBA data of the sequential I/O which thereby allows for the grid distribution to distribute the I/O to multiple modules and/or processes. Moreover, by performing these internal striping processes using existing LBA data received with the logical unit, the computational resources corresponding to each of the multiple modules and/or processes (e.g., compute nodes) in the grid storage array may be utilized, thereby increasing system efficiency and reducing processing delays.

As mentioned above, some of the approaches included herein desirably spread logical partition data across multiple different physical partitions. Accordingly, the data chunks formed in operation 510 may be distributed across multiple different physical partitions in memory. For instance, referring momentarily back to FIG. 4B, data chunks formed by the striping formula modules 462 may be sent between any of the striping formula modules 462 and memory nodes 464 in order to achieve a desirable distribution of the data chunks.

Figure 7A:
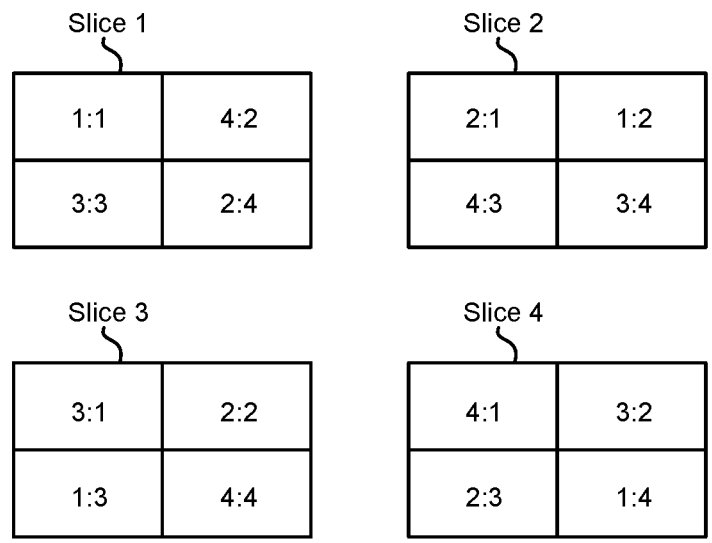
FIG. 7A is a partial representational view of slices of a grid storage array in accordance with one in-use embodiment.
Figure 7B:
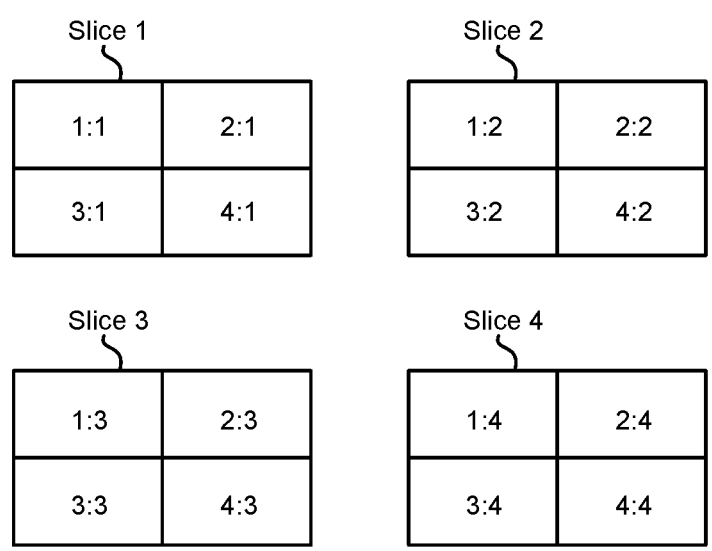
FIG. 7B is a partial representational view of slices of a grid storage array in accordance with one in-use embodiment.

Referring still to FIG. 5, method 500 also includes distributing the plurality of data chunks across the subset of slices such that the plurality of data chunks are striped across the subset of slices, and striped across a plurality of physical partitions in each of the subset of slices. See operation 512. In other words, the plurality of data chunks formed in operation 510 may be distributed across a subset of slices, and across a plurality of physical partitions in each of the subset of slices, such that one or more of the plurality of data chunks are stored in one or more respective physical partitions in each of the subset of slices. Depending on the desired approach, performing operation 512 may include implementing different distribution schemes. The different distribution schemes may include striping the plurality of data chunks across the subset of slices dynamically or statically. Moreover, the distribution schemes may include striping the plurality of data chunks across the plurality of physical partitions in each of the subset of slices dynamically or statically. Several exemplary distribution schemes are described in further detail below with reference to the approaches which correspond to FIGS. 7A-7B.

Returning to FIG. 5, from operation 512, the flowchart proceeds to operation 508, whereby method 500 may end, e.g., as described in the approaches above.

According to an exemplary approach, which is in no way intended to limit the invention, Equation 1 below may be used to calculate the stripe size of each of the stripes.

$$\frac{\text{partition size}}{\text{strip size}} \times \text{partition size} = \text{stripe size} \quad \text{Equation 1}$$

In some approaches, the striping formula may use a predetermined size of each of the plurality of data chunks to determine an actual placement of each of the respective data chunks in the subset of slices. Moreover, the determination as to an actual placement of each of the respective data chunks in the subset of slices may be based on the LBA data corresponding to each of the data chunks. Accordingly, LBA data which may have been received with a logical unit (e.g., see operation 502) may be used to split the logical unit into a plurality of data chunks. In some approaches, the LBA data may be accessed from memory where it was previously stored upon receiving the logical unit as mentioned above.

It should be noted that each of the subset of slices preferably correspond to a different physical storage module in a single storage device. However, as noted above, the size, style, architecture, organization, etc. of the "single storage device" may vary depending on the approach, and is in no way intended to limit the invention. For instance, the "single storage device" is preferably a collection of successive partitions grouped together and managed as one internally striped entity. Accordingly, in some approaches the "single storage device" may be a storage tier of a storage system (e.g., see storage tiers 302, 306, 316 of FIG. 3), the storage media thereof being grouped together and managed as one internally striped entity. Accordingly, each of the storage media may be considered different physical storage modules in the same single storage device. In some approaches the single storage device may include at least one hard disk drive. In other approaches the single storage device includes at least one solid state drive. In still other approaches, the "single storage device" may actually be a distributed system which is grouped together and managed as one internally striped entity. Moreover, each of the storage media included in the distributed system may be considered different physical storage modules in the same single storage device. However, it is preferred that the single storage device is part of the storage grid array. As a result, operation 512 allows for parallelism to be implemented, e.g., as would be appreciated by one skilled in the art after reading the present description.

It should also be noted that the number of slices included in the subset of slices may be significantly smaller than the total number of slices included in the single storage device. In other words, the number of slices in the subset of slices $X_s$ may be represented mathematically with respect to the total number of slices included in the single storage device $X_t$ as: $1<X_s<<X_t$. According to an example, which is in no way intended to limit the invention, a subset of slices may include 4 slices, while the total number of slices included in the single storage device may be 16,411 slices.

According to an in-use example, which is in no way intended to limit the invention, Equation 1 may be used to calculate a stripe size of 1 GB for a storage environment having a strip size of 256K and a partition size of 16 MB. The stripe size of 1 GB may be made up of 64 rows and 64 columns of positional information corresponding to the single storage device. As mentioned above, each of the 64 columns preferably correspond to a different physical partition of a storage device, while each of the 64 rows include 64 strips. It follows that each strip in a given row is located in a different physical partition of the storage device.

The striping formula may be used to transform sequential LBAs into LBAs which are distributed across multiple distribution partitions. This transformation may be achieved by modifying the LBA of the sequential I/O which thereby allows for the grid distribution to distribute the I/O to multiple modules and/or processes. Moreover, the determination as to an actual placement of each of the respective data chunks in the subset of slices may be based on the LBA of each of the data chunks.

FIG. 6A illustrates a table 600 which represents the partition index and strip index information corresponding to an input, while FIG. 6B illustrates a table 650 which represents the partition index and strip index output as a result of the transformation caused by implementing a striping formula. In other words, table 600 represents the partition index and strip index information corresponding to the LBA data which may be received with the logical unit, while table 650 represents a result of the transformation caused by implementing a striping formula.

Again, table 600 includes partition index and strip index information corresponding to the sequential LBA data received. Accordingly if a sequential data stream is being initiated in the input partition shown in FIG. 6A, the data stream may be presented to the storage by increasing addresses. For instance, a first address P0S0 is followed by address P0S1 which in turn is followed by address P0S2, and so on until address P0S63 is reached. Thereafter, address P1S0 is followed by address P1S1, and so on. As shown, this progression is achieved by consecutive increments of the address in each partition before moving to a next partition.

However, storing data in a manner which fills each physical partition of a storage device individually before moving to a subsequent one is undesirable as it limits the available computing power. Accordingly, looking to table 650, the output partition index and strip index has been transformed (e.g., using a striping formula) from that which is shown in table 600, such that each strip in a same partition of table 650 are presented in a vertical manner. In other words, each subsequent strip corresponds to a different internal partition of the storage device. As a result, the data chunks corresponding to a received logical unit may be distributed such that a first data chunk is stored at address P0S0, a second data chunk is stored at address P1S0, a third data chunk is stored at address P2S0, and so on.

By implementing the transformed partition index and strip index, data chunks may be stored such that a strip of each internal partition of the storage device are utilized. As a result, a level of parallelism is achieved which allows multiple compute modules to contribute toward performing data processing of even a single data partition. In other words, by implementing partitions in a way that the workload is better balanced across a plurality of compute modules, the performance of the whole grid storage array is significantly improved. Moreover, because these improvements are achieved using the existing LBA data corresponding to the data chunks of the logical unit received, this distribution may be performed without introducing any additional metadata to the data management process. By doing that the overall performance of the grid storage array is improved and the latency is significantly reduced.

However, it should be noted that in some instances the transformation achieved by implementing a striping formula may cause a select few of the stripes to not be striped as intended. In such instances, the slice granularity and stripe granularity may not overlap, thereby causing a "corner case" to develop which is not striped. This lack of overlap between the slice granularity and stripe granularity may result from the volume accounting requirements being represented in slice granularity, e.g., as would be appreciated by one skilled in the art after reading the present description. Stripes which are not actually striped may be stored in memory using alternate storage processes. For instance, stripes which are not actually striped may be stored sequentially in memory. Due to the relatively small number of stripes which may experience a "corner case" (for example, 1 in every 97 stripes), the impact this issue has on the performance of the grid storage array is negligible, particularly in view of the significant improvements achieved by the various approaches included herein.

The manner in which data chunks are distributed (e.g., striped) across the subset of slices and/or the physical partitions in each of the subset of slices may vary depending on the desired approach. In an effort to accurately explain some of the different distribution schemes which may be employed, an in-use example is presented below. It should be noted that the in-use example is in no way intended to limit the invention, but rather is presented for exemplary purposes.

As mentioned above, rather than mapping a logical partition one-to-one with a physical partition in a slice, the approaches included herein preferably spread each logical partition data across 'N' physical partitions using data chunks. The actual number 'N' of physical partitions implemented in a given approach may be configured per logical unit, or for the whole grid storage array. According to the in-use example, 'N' will be set equal to 4. Thus, 4 successive physical partitions will be used to share the data load among them.

Accordingly, suppose a new partition is written to the logical unit having a LBA of LBA_n. In order to find the correct slice where a first chunk of the partition should be written to (assuming for the sake of discussion, that there is no logical unit offset), a calculation of LBA_n modulo 4 may be performed. For instance, it may be determined that a first chunk of the LBA_n should be written to slice 2. Thus, the first data chunk (out of the 4 which the new partition was split into) may be written to a data chunk which is already used and which corresponds to the current partition. However, in other approaches new partitions may be allocated for the first data chunk in the partition table in all slices thereof. Thus, looking to FIG. 7A, the first chunk may be written in slice 2 and is represented by the 2:1 entry. Moreover, the second chunk is preferably written on the subsequent slice 3 as 2:2, and the third chunk is written in the fourth slice (per the partition table) as 2:3. Furthermore, the final chunk is written in the first slice as 2:4. By using this distribution scheme, the calculation performed in order to find the correct slice where the first chunk of the partition should be written to (i.e., LBA_n modulo 4) serves as an "anchor partition". Accordingly, each chunk of the partition may have a different anchor in the respective stripe, where the different anchors desirably avoid hot spots from forming, e.g., as would be appreciated by one skilled in the art after reading the present description.

According to another distribution scheme, the chunks of the partition may simply begin at a first one of the slices and progress therefrom. In other words, the data chunks may be striped across a plurality of successive slices. Looking to FIG. 7B, the first chunk of the partition may be stored in slice 1 as 1:1, while the second chunk of the partition may be stored in slice 2 as 1:2. Similarly, the third chunk of the partition may be stored in slice 3 as 1:3, and the fourth chunk of the partition may be stored in slice 4 as 1:4.

This distribution scheme may be relatively simple to implement (at least in comparison to other distribution schemes) as it is unnecessary to ensure the slices reside on different physical devices, as well as not using metadata to describe a more complex storage layout. However, there are certain situations in which performance may be effected. For example, multiple pieces of data within a given logical unit may be accessed simultaneously. During such an access, the "random" chunks accessed may be the same in the each of the respective partitions, which will result in the same physical partition which hosts each of the data chunks being accessed. Accordingly, distribution of data processing may be somewhat limited in situations implementing this distribution scheme.

Yet another possible distribution scheme may be considered when RAID1 is used to keep one copy of the data in a single monolithic partition, while the second copy is spread across a well-defined partition group. As a result, the distribution scheme may cater to serial I/O scenarios more efficiently, e.g., as would be appreciated by one skilled in the art after reading the present description.

It follows that, as described above, the manner in which data chunks are distributed (e.g., striped) across the subset of slices and/or the physical partitions in each of the subset of slices may vary depending on the desired approach. In some approaches, the plurality of data chunks may be striped across the subset of slices statically, while also being striped across the plurality of physical partitions in each of the subset of slices dynamically. In other approaches, the plurality of data chunks may be striped across the subset of slices dynamically, while also being striped across the plurality of physical partitions in each of the subset of slices statically. In still other approaches, the plurality of data chunks may be striped across both the subset of slices and the plurality of physical partitions in each of the subset of slices statically. Moreover, in other approaches, the plurality of data chunks may be striped across both the subset of slices and the plurality of physical partitions in each of the subset of slices dynamically.

The improvements achieved as a result of storing data according to the various approaches described above may also be realized (e.g., experienced) when accessing data stored in a grid storage environment. Accordingly, the LBA data may be used to locate a given data chunk which has been stored in the single storage device, thereby improving performance of the single storage device by reducing data access times in addition to reducing latency by not adding (e.g., introducing) any metadata. Rather than using metadata, both the external striping processes and the internal striping processes as described herein use the LBA data to find the actual placement of desired data in the grid storage array. The external striping processes may simply uses the LBA data to find the slice in which the desired data is located, while the internal striping processes uses a striping formula in combination with the LBA data to determine which partition in the identified stripe the data is located (e.g., stored). Moreover, an actual storage address in the partition may further be determined, e.g., as would be appreciated by one skilled in the art after reading the present description.

Figure 8:
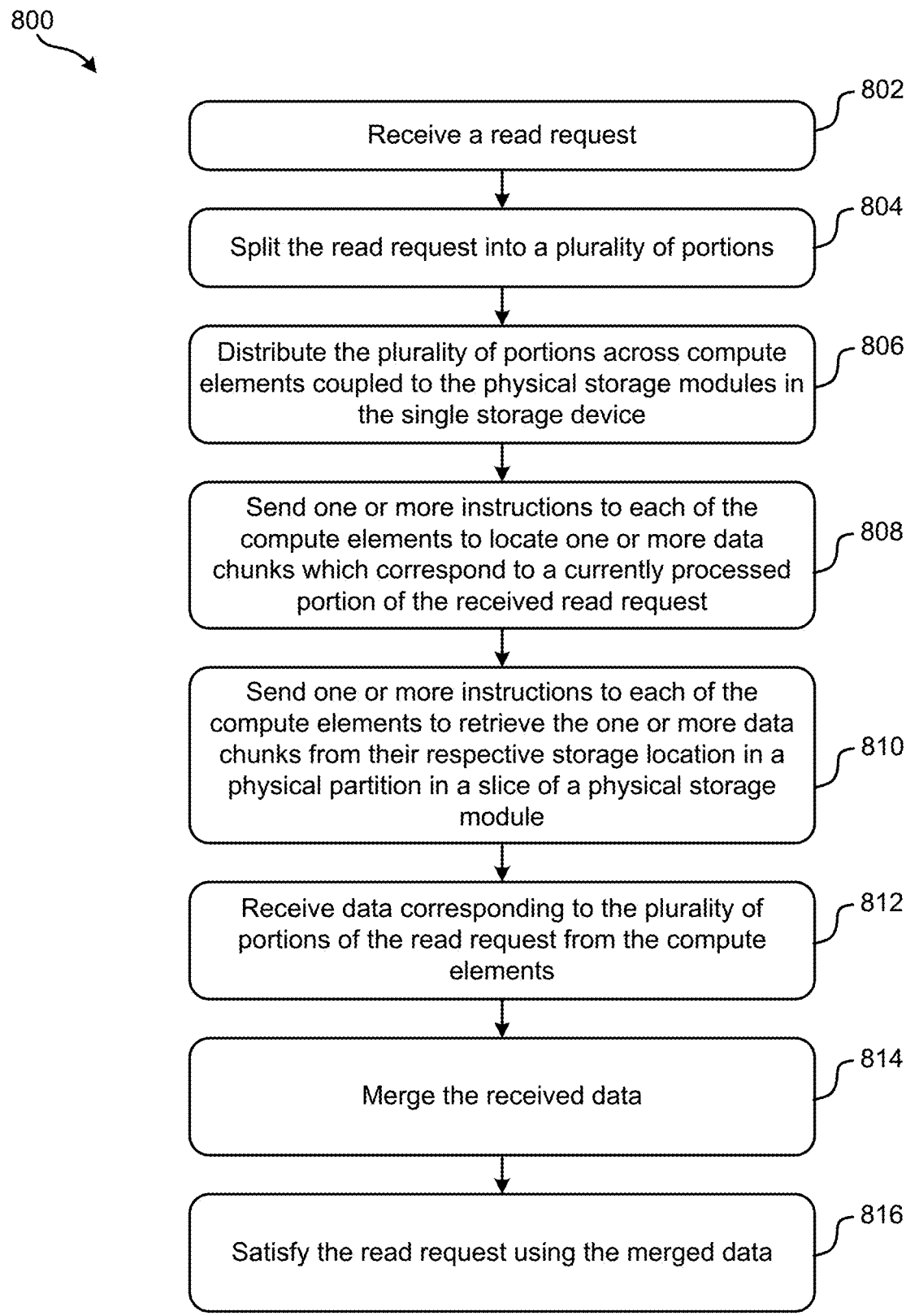
FIG. 8 is a flowchart of a method in accordance with one embodiment.

Looking now to FIG. 8, FIG. 8 includes a flowchart of a method 800 for performing read requests on a grid storage array, according to one embodiment. The method 800 may be performed in accordance with the present invention in any of the environments depicted in FIGS. 1-6C, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, any one or more of the processes included in method 800 may be performed by a central controller of the grid storage array (e.g., see 466 in FIG. 4B above). However, in another example, various ones of the processes included in method 800 may be performed by one or more of the compute elements in a storage grid array. In various other approaches, any one or more of the processes included in method 800 may be partially or entirely performed by a controller, a processor, a computer, etc., or some other device having one or more processors therein. Thus, in some embodiments, method 800 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module (s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, operation 802 of method 800 includes receiving a read request. In some approaches, the read request received may correspond to data having sequential LBAs.

Looking to operation 804, the read request may be split into a plurality of portions. As described above, by splitting requests into a plurality of portions, each portion may be performed by a different compute module. Thus, by splitting the read request into a plurality of portions, each portion may be delegated to a different compute module in the grid storage array. Moreover, because each portion of the request is performed by a different compute module, multiple ones (preferably all) of the request portions may be performed in parallel.

Accordingly, looking to operation 806, method 800 also includes distributing the plurality of portions across compute elements coupled to the physical storage modules in the single storage device such that one or more of the plurality of portions of the read request may be processed by each of the compute elements in parallel. As a result, data access times may be reduced, grid storage array throughput may be increased, compute module backlogs may be decreased, etc.

It should again be noted that the size, style, architecture, organization, etc. of the "single storage device" may vary depending on the approach, and is in no way intended to limit the invention. For instance, the "single storage device" is preferably a collection of successive partitions grouped together and managed as one internally striped entity. Accordingly, in some approaches the "single storage device" may be a storage tier of a storage system (e.g., see storage tiers 302, 306, 316 of FIG. 3), the storage media thereof being grouped together and managed as one internally striped entity. Accordingly, each of the storage media may be considered different physical storage modules in the same single storage device. In some approaches the single storage device may include at least one hard disk drive. In other approaches the single storage device includes at least one solid state drive. In still other approaches, the "single storage device" may actually be a distributed system which is grouped together and managed as one internally striped entity. Moreover, each of the storage media included in the distributed system may be considered different physical storage modules in the same single storage device. However, it is preferred that the single storage device is part of the storage grid array.

With continued reference to FIG. 8, method 800 additionally includes sending one or more instructions to each of the compute elements to locate one or more data chunks which correspond to a currently processed portion of the received read request. See operation 808. Furthermore, operation 810 includes sending one or more instructions to each of the compute elements to retrieve the one or more data chunks from their respective storage location in a physical partition in a slice of a physical storage module. It should be noted that because the various portions of the read request may be performed by any desired compute module, the storage location in which the data corresponding to the read request portion may not be directly related to the compute module. In other words, the data corresponding to a given portion of the read request may be stored on a different physical storage module than the one which the given compute element is actually coupled to. For instance, refer back to FIG. 4B. Accordingly, any one or more of the compute modules may send one or more instructions (e.g., requests) to the storage location at which the data corresponding to the portion of the read request is stored, e.g., as would be appreciated by one skilled in the art after reading the present description.

Referring still to FIG. 8, operation 812 method 800 additionally includes receiving data corresponding to the plurality of portions of the read request from the compute elements, while operation 814 includes merging the received data. Furthermore, operation 816 includes satisfying the read request using the merged data. In other words, operation 816 may include sending the merged data to a source of the read request received in operation 802.

The various approaches included herein introduce innovative ways of performing internal striping in a single storage device. Accordingly, a host may be able to use a single storage volume without any striping being performed by the operating system. Despite the fact that the operating system does not perform any striping, the full performance of the grid storage array may be gained.

Moreover, only a single volume may be exported to the user and only a single volume will be allocated inside the grid storage array. This results from the striping being performed inside the volume itself, as well as distributing the data using a striping formula according to any of the approaches described herein.

An interface node which receives the I/O may also perform a formula calculation, which may be based on the I/O logical block address. Moreover, based on the calculation, the LBA may be modified (e.g., transformed) for striping distribution. Each of the grid storage array compute modules may also be utilized and handle I/O, even for fully sequential workloads.

It follows that various ones of the approaches included herein are able to reduce processing latency, decrease the computational workloads placed on different processors, increase data access times, etc., without increasing memory consumption. As described above, at least some of these improvements are achieved because each storage slice is located on a different physical module, or at least managed by a different compute module (e.g., CPU). Thus, by distributing data chunks of a larger logical unit according to the various approaches included herein, each data chunk may be processed by a different compute node, thereby significantly improving performance. Further still, these improvements may be achieved without introducing any additional metadata to the data management process. Accordingly, the various performance based improvements included herein are achieved without increasing memory consumption at all.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for performing internal striping within a subset of slices, comprising:
   receiving, by a computer, a logical unit;
   splitting, by the computer, the logical unit into a plurality of data chunks; and
   distributing, by the computer, the plurality of data chunks across the subset of slices such that the plurality of data chunks are striped across the subset of slices, and striped across a plurality of physical partitions in each of the subset of slices,
   wherein each of the subset of slices correspond to a different physical storage module in a single storage device.

2. The computer-implemented method of claim 1, wherein the plurality of data chunks are striped across a plurality of successive slices.

3. The computer-implemented method of claim 1, wherein splitting the logical unit into a plurality of data chunks includes using a striping formula, wherein the striping formula uses a predetermined size of each of the plurality of data chunks to determine a placement of each of the respective data chunks in the subset of slices.

4. The computer-implemented method of claim 1, wherein the logical unit includes a plurality of sequential logical block address (LBA) data.

5. The computer-implemented method of claim 4, comprising:
   using, by the computer, the LBA data to locate a given data chunk in the single storage device, thereby improving performance of the single storage device.

6. The computer-implemented method of claim 1, wherein the single storage device is part of a storage grid array.

7. The computer-implemented method of claim 6, wherein the single storage device includes at least one hard disk drive and/or at least one solid state drive.

8. The computer-implemented method of claim 1, wherein distributing the plurality of data chunks across the subset of slices includes:
   using a distribution scheme to determine a first slice of the subset of slices to write a first chunk of the partition to;

sending one or more instructions to write the first chunk of the partition to a physical partition in the first slice of a respective physical storage module in the single storage device; and using the first slice as an anchor position while distributing a remainder of the plurality of data chunks across the subset of slices of the respective physical storage module in the single storage device.

9. The computer-implemented method of claim 1, wherein the computer is a compute element of a storage grid array.

10. The computer-implemented method of claim 1, comprising:

receiving, by the computer, a read request;

splitting, by the computer, the read request into a plurality of portions;

distributing, by the computer, the plurality of portions across compute elements coupled to the physical storage modules such that one or more of the plurality of portions of the read request are processed by each of the compute elements in parallel;

receiving, by the computer, data corresponding to the plurality of portions of the read request from the compute elements; and satisfying, by the computer, the read request.

11. The computer-implemented method of claim 1, comprising:

determining, by the computer, whether storing the logical unit in series is more efficient than storing the logical unit in a striped manner; and sending, by the computer, the logical unit to a compute element of a given physical storage module to be stored in series in response to determining that storing the logical unit in series is more efficient than storing the logical unit in a striped manner.

12. The computer-implemented method of claim 1, wherein the plurality of data chunks are striped across the subset of slices statically, wherein the plurality of data chunks are striped across the plurality of physical partitions in each of the subset of slices dynamically.

13. The computer-implemented method of claim 1, wherein the plurality of data chunks are striped across the subset of slices dynamically, wherein the plurality of data chunks are striped across the plurality of physical partitions in each of the subset of slices statically.

14. A computer program product for performing internal striping within a subset of slices, the computer program product comprising a computer readable storage medium having program instructions embodied therewith, wherein the computer readable storage medium is not a transitory signal per se, the program instructions readable and/or executable by a processor to cause the processor to perform a method comprising:

receiving, by the processor, a logical unit;

splitting, by the processor, the logical unit into a plurality of data chunks; and distributing, by the processor, the plurality of data chunks across the subset of slices such that the plurality of data chunks are striped across the subset of slices, and striped across a plurality of physical partitions in each of the subset of slices, wherein the subset of slices are in a single physical storage module in a single storage device.

15. The computer program product of claim 14, wherein distributing, by the processor, the plurality of data chunks across the subset of slices includes:

striping the plurality of data chunks across a plurality of successive slices in the subset of slices, wherein the logical unit includes a plurality of sequential logical block address (LBA) data, wherein the single storage device includes additional physical storage modules, wherein each of the additional physical storage modules include a subset of slices, respectively.

16. The computer program product of claim 15, the program instructions readable and/or executable by the processor to cause the processor to perform the method comprising:

using, by the processor, the LBA data to locate a given data chunk in the single storage device, thereby improving performance of the single storage device, wherein the LBA data is used along with a striping formula to split the logical unit into the plurality of data chunks.

17. The computer program product of claim 14, wherein splitting the logical unit into a plurality of data chunks includes using a striping formula, wherein the striping formula uses a predetermined size of each of the plurality of data chunks to determine a placement of each of the respective data chunks in the subset of slices.

18. The computer program product of claim 14, wherein the single storage device includes a collection of successive partitions which are grouped together and managed as a single internally striped entity, wherein the single storage device is part of a storage grid array.

19. The computer program product of claim 18, wherein the single storage device includes at least one hard disk drive and/or at least one solid state drive.

20. The computer program product of claim 18, wherein distributing the plurality of data chunks across the subset of slices includes:

using a distribution scheme to determine a first slice of the subset of slices to write a first of the plurality of data chunks to;

sending one or more instructions to write the first of the plurality of data chunks to a physical partition in the first slice in the single physical storage module in the single storage device; and using the first slice as an anchor position while distributing a remainder of the plurality of data chunks across the subset of slices in the single physical storage module in the single storage device.

21. The computer program product of claim 14, the program instructions readable and/or executable by the processor to cause the processor to perform the method comprising:

receiving, by the processor, a read request;

splitting, by the processor, the read request into a plurality of portions;

distributing, by the processor, the plurality of portions across compute elements coupled to the physical storage modules such that one or more of the plurality of portions of the read request are processed by each of the compute elements in parallel;

receiving, by the processor, data corresponding to the plurality of portions of the read request from the compute elements; and satisfying, by the processor, the read request.

22. The computer program product of claim 14, the program instructions readable and/or executable by the processor to cause the processor to perform the method comprising:

determining, by the processor, whether storing the logical unit in series is more efficient than storing the logical unit in a striped manner; and sending, by the processor, the logical unit to a compute element of a given physical storage module to be stored in series in response to determining that storing the logical unit in series is more efficient than storing the logical unit in a striped manner.

23. The computer program product of claim 14, wherein the plurality of data chunks are striped across the subset of slices statically, wherein the plurality of data chunks are striped across the plurality of physical partitions in each of the subset of slices dynamically.

24. The computer program product of claim 14, wherein the plurality of data chunks are striped across the subset of slices dynamically, wherein the plurality of data chunks are striped across the plurality of physical partitions in each of the subset of slices statically.

25. A system comprising:

a processor; and logic integrated with the processor, executable by the processor, or integrated with and executable by the processor, the logic being configured to:

receive, by the processor, a logical unit;

split, by the processor, the logical unit into a plurality of data chunks; and distribute, by the processor, the plurality of data chunks across a subset of slices such that the plurality of data chunks are striped across the subset of slices, and striped across a plurality of physical partitions in each of the subset of slices, wherein the subset of slices are in a single physical storage module in a single storage device, wherein the single storage device includes a collection of successive partitions which are grouped together and managed as a single internally striped entity.

* * * * *